(12) United States Patent
Pashupathy et al.

(10) Patent No.: US 6,574,660 B1
(45) Date of Patent: Jun. 3, 2003

(54) INTELLIGENT CONTENT DELIVERY SYSTEM BASED ON USER ACTIONS WITH CLIENT APPLICATION DATA

(75) Inventors: Anand Pashupathy, Portland, OR (US); Paul Greer, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/473,306

(22) Filed: Dec. 28, 1999

(51) Int. Cl.$^7$ .............................................. G06F 15/16
(52) U.S. Cl. ........................ 709/217; 709/202; 707/10
(58) Field of Search ................................. 709/217, 201, 709/203, 225, 226, 246; 707/10

(56) References Cited

U.S. PATENT DOCUMENTS

| | | | | |
|---|---|---|---|---|
| 5,671,225 A | * | 9/1997 | Hooper et al. | 370/468 |
| 6,236,991 B1 | * | 5/2001 | Frauenhofer et al. | 707/6 |
| 6,260,021 B1 | * | 7/2001 | Wong et al. | 705/1 |
| 6,298,228 B1 | * | 10/2001 | Singh | 455/403 |
| 6,308,203 B1 | * | 10/2001 | Itabashi et al. | 707/10 |
| 6,339,826 B2 | * | 1/2002 | Hayes et al. | 709/226 |
| 6,359,270 B1 | * | 3/2002 | Bridson | 219/679 |
| 6,396,531 B1 | * | 5/2002 | Gerszberg et al. | 348/14.01 |
| 6,401,085 B1 | * | 6/2002 | Gershman et al. | 707/4 |
| 6,418,466 B1 | * | 7/2002 | Bertram et al. | 709/221 |
| 6,424,968 B1 | * | 7/2002 | Broster et al. | 707/3 |

* cited by examiner

Primary Examiner—Mehmet B. Geckil
(74) Attorney, Agent, or Firm—Blakely, Sokoloff, Taylor & Zafman LLP

(57) ABSTRACT

A computer implemented method for generating results information, wherein the results information is utilized to provide intelligent content from a provider to a user. In one embodiment, the method collects relevant data from a user, from the user's computer, and from a provider. The embodiment of the method then generates the results information from the relevant data specifying which content from a provider is relevant to a user. The embodiment then downloads content from the provider in accordance with the results information.

15 Claims, 5 Drawing Sheets

| CAPABILITY PAGE ID | HARDWARE CAPABILITIES SUPPORT | | INTEREST CAPABILITIES SUPPORT | | | MISC. CAPABILITIES SUPPORT | | | | NEXT PAGE |
|---|---|---|---|---|---|---|---|---|---|---|
| | CPU TYPE | GRAPHICS CARD SUPPORT | CONNECTION SPEED | CAP 1 | CAP 2 | CAP 3 | | | | |

INTELLIGENT CONTENT DELIVERY SYSTEM BASED ON USER ACTIONS WITH CLIENT APPLICATION DATA

BACKGROUND OF THE INVENTION

1. Field of the Invention

The invention is related to information systems. More specifically, the invention relates to delivery of content to users located over networks.

2. Description of Related Art

What is commonly referred to as the "Internet" has become a fundamental information medium in today's world. The Internet is a globally interconnected network of networks that provide an infrastructure for services such as FTP (File Transfer Protocol). The latter service HTTP has become the predominant form of information presentation and delivery on the World Wide Web (hereinafter the "Web"), a term used to describe the Internet as it relates to HTTP. The Web is a convenient form of information layout and delivery because in its raw form it is easy to use, decode, and display. The primary mechanism used to display Web content is an application known as a "browser," such as the "Navigator™" (a product of Netscape Communications Corp.). The use of the web has become so prolific as a result of this ease that the number of Web sites (those Internet locations offering HTTP-based content) has increased beyond measure and grows at an ever-increasing pace.

Due to the myriad number of sites and pages of content offered, it is often difficult for a user to find content that is meaningful or useful. This sometimes occurs even if the appropriate web site is found, because that site may have so many pages of content, that finding a particular item of interest is time-consuming and/or difficult. This frustration has led to a number of technologies, primary of which are the "search engine" and "Push". The search engine is an indexing mechanism in which web sites are categorized, or their pages analyzed for keywords which are then poured into a master database. By searching on relevant keywords or accessing categories, a listing of web pages or web sites appears which the user can browse. The relevance of these listings to what the user is actually seeking to find is often questionable and depends upon many external factors, such as the organization of the web sites, the success of their submission and indexing into the particular search engine used (there are many different ones), and the appropriateness and database matching of the keyword or category selected. Where it is known that a content provider wishes to provide certain information, this content can be "pushed" to the user. One popular form of Push technologies is the delivery of advertisements (banner ads) to the unsuspecting user. Push technology is often intrusive and annoying and attempts to make it friendlier to the user have gone largely unsuccessful. There is a need for a better content delivery system, based upon the preferences of a user and capabilities of both provider and user, that delivers information useful and relevant to the user.

SUMMARY

What is disclosed is a method that includes generating results, the results specifying which content from a provider is relevant to a user, and downloading content from the provider in accordance with the results.

BRIEF DESCRIPTION OF THE DRAWINGS

FIG. 3 illustrates a capability page for a participating provider in intelligent content delivery.

DETAILED DESCRIPTION OF THE INVENTION

The exemplary embodiments described herein are provided merely to illustrate the principles of the invention and should not be construed as limiting the scope of the invention. Rather, the principles of the invention may be applied to a wide range of systems to achieve the advantages described herein and to achieve other advantages or to satisfy other objectives as well.

Intelligent content delivery involves an exchange of "interest" and "capability" information about the user and content provider. This profiling is utilized by agents to pull provider content that is relevant to the user. The relevancy is determined by applying rules to the interest and capability information and matching these with the information of the content provider. Thus, whenever a user visits a web site that employs intelligent content delivery, the user will be automatically pushed content from the site that is more relevant to their interests, needs, and usage. The system allows updating such that as interest and capability changes, the content pushed can also change.

Figure 1:
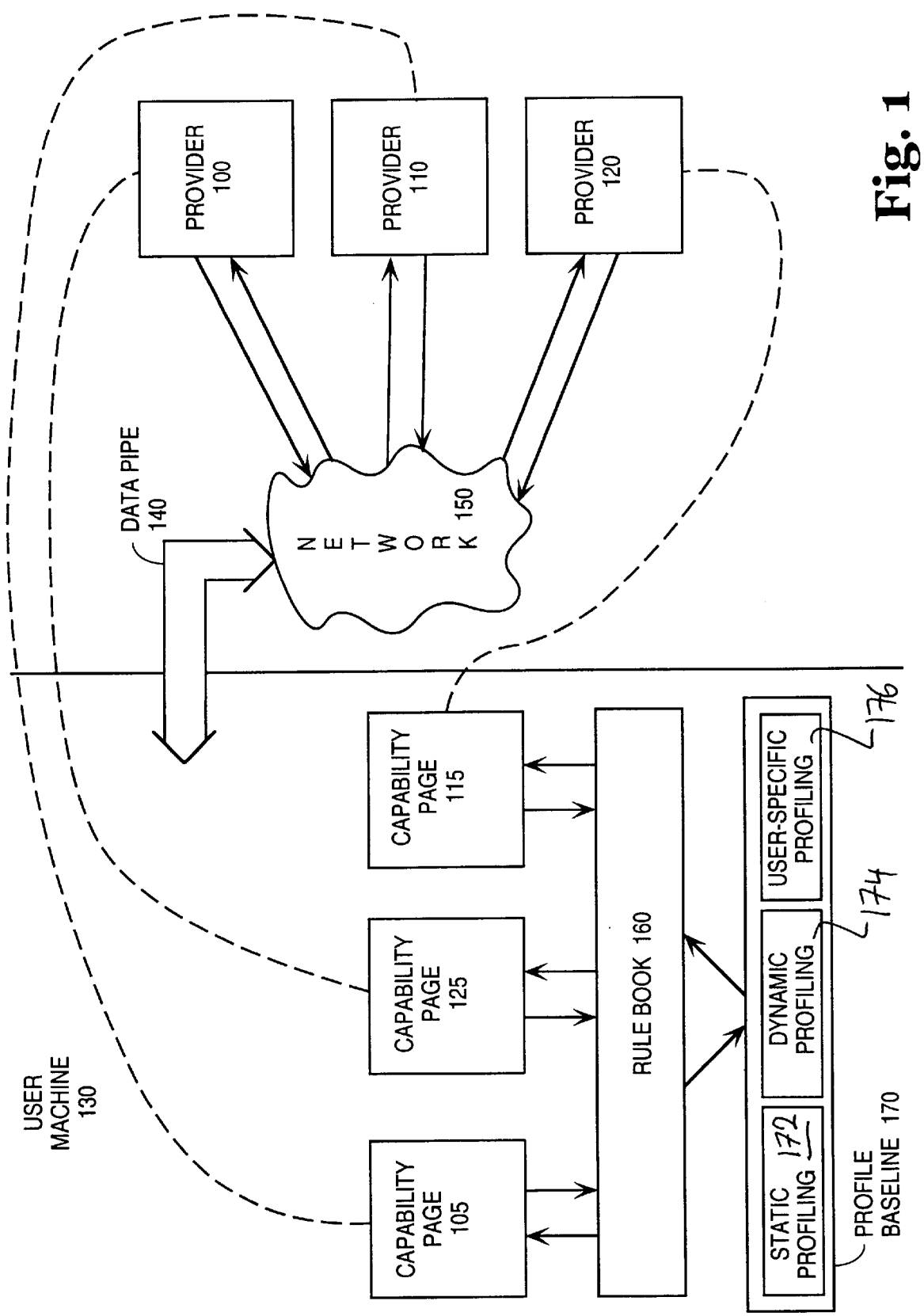
FIG. 1 illustrates a system utilizing intelligent content delivery.

FIG. 1 illustrates one embodiment of a system utilizing intelligent content delivery.

A user machine 130 may be any general or special purpose information device such as a personal computer which can communicate across a network 150 (such as the Internet) by means of a data pipe 140 (such as an IP connection). Such connectivity allows the user machine 130 to browse/download content from one of more content providers, such as providers 100, 110, and 120 shown in FIG. 1.

According to one embodiment of the invention, the user machine 130 contains a baseline profile 170, which contains information about the user and the user machine 130. The profiling information in baseline profile 170 may be classified into three categories—static, dynamic, and user-specific. Thus, the baseline profile 170 is shown in FIG. 1 includes static profiling 172, dynamic profiling 174, and user-specific profiling 176. Static profiling 172 holds information that does not frequently change. For example, the speed of the CPU (Central Processing Unit), the amount of total system memory and level of graphics capability of the user machine could all be classified into static profiling 172. Although static profiling 172 may be updated as needed it is not expected to change and is not automatically queried for updating.

Information that is likely or known to change frequently, such as the free hard disk space of the user machine 130, can be held in a dynamic profiling 174.

One unique feature of the content delivery system is user-specific profiling 176, which is also held in the baseline profile 170. User-specific profiling 176 includes information such as the user's age, sex, or other bio-data, and, most importantly can include a listing of activities, interest, likes, and dislikes. For instance, one user-specific profiling may indicate basketball as the favorite sport of the user while another user's user-specific profiling may indicate that baseball is the favorite sport of that user. The user-specific profiling is customizable and readily updateable by the user and can be fine-tuned to be more or less specific as desired by the user.

Using the baseline profile 170, content providers may be able to provide content that is more relevant to the user such that the user when visiting the web page of that provider is instantly provided with information matching the baseline profile. An example of such relevancy matching would include a sports score web site providing scores about the user's favorite sports or teams without the user specifically requesting this information (by having to browse or search through the web site). One means of ensuring such relevant content delivery is the use of a rule book and capability pages.

Each participating provider has a capability page created and maintained in the user machine 130 on their behalf. For example, provider 100 has a capability page 125, provider 110 has a capability page 105, and provider 120 has a capability page 115. Each capability page includes profiling information of the provider such as the general subject matter of the site maintained by the provider, whether or not the site contains explicit material, and/or information about what hardware/software the provider supports in terms of viewing the content given (such as Java™ capability, display size of the pages being viewed etc.). The capability pages allow the participating provider to leave a record/announcement of what it has to offer the user. The content of the capability pages, which may be updated and modified as needed, are discussed in greater detail below with respect to FIG. 3.

User machine 130 maintains a rule book 160 which specifies conditions and parameters for matching the capability pages with the baseline profiling. For instance, one rule in the rule book 160 may ask to block the provider pages which contain explicit material. Since a provider's content will be announced via the capability page and viewed directly by browsing, at least after the first visit to the provider's site, the user will be able to create rule pages for a particular condition. This filtering allows the capability page to maintain a distinctiveness from the baseline profile such that the user is not precluded from later reviewing the provider's capability and modifying the rule after creation, if the user's interest or needs changes. The rule book is a data store that is specific to users of a given computer and that allows users to influence how they want content to be customized. Customization using the rule book allows for the merging of the capability of the provider with the profile of a user. It is this merging that improves delivery of user-specific content.

With such a system that incorporates a rule book, a baseline profile, and provider capability pages, content delivery is made intelligent. The content delivered to the user is based not only on a match of the baseline profile with the site but also with reference to the capability page and rule book which merges these three components to create meaningful results. For instance, merely because a user has the capability to display high quality color graphics, the user may decide to institute a rule that avoids such content when his network connection speed falls below a certain level. Advantageously, each user machine that incorporates the elements of user machine 130 will receive for its user more relevant content than that possible with traditional database searching/matching systems in the art.

Figure 2:
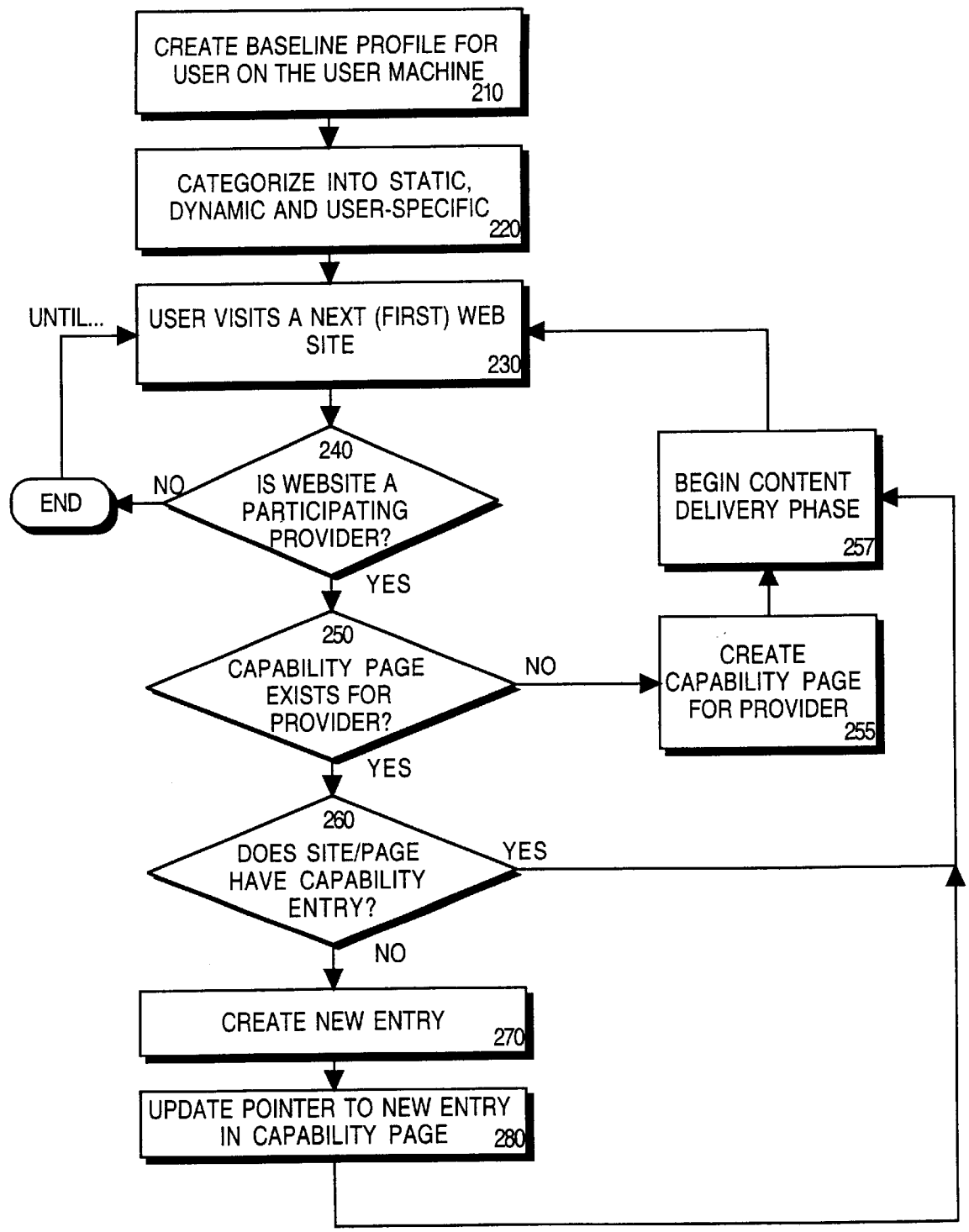
FIG. 2 is a flow diagram of the setup phase for intelligent content delivery.

FIG. 2 is a flow diagram of one embodiment of a setup phase for intelligent content delivery.

The illustrated setup phase includes a one-time initial setup and an on-going setup procedure for newly visited web sites or providers. The one-time initial setup is shown as blocks 210 and 200 in FIG. 2. The first time a user logs onto the Internet or whatever network they are using, a baseline profile is created (block 210). The baseline profile may be created by a combination of querying system information regarding the user machine and prompting the user for likes, dislikes, and perhaps bio-data. Once the baseline profile is created the information obtained can be categorized into static, dynamic, and user-specific (block 220). This initial setup provides a baseline profile, which has categorized information which may then be updated and applied to participating content provider capability page(s). Once created, the baseline profile may then be updated as necessary (not shown). These updates can happen automatically or with user intervention.

The potentially recurring or on-going part of the setup phase begins whenever the user visits the next (or first) web site (block 230). If the web site is not a participating provider (checked at block 240), then no further action is taken until a web site is visited that is a participating provider. If the web site is part of a participating content provider, then the first condition to determine is whether a capability page already exists for the provider (checked at block 250). Larger participating providers may have more than one web site under their purview or may have such broad-ranging content that capabilities and subject-matter may widely vary from page to page. To best facilitate this multi-web site, multi-page possibility, each provider is given one main capability page, which may link by way of pointers to entries for capability pages for other sites and pages. This is described below with reference to FIG. 3. Thus, even if a capability page exists for the provider, the capability pages for that provider must be inspected to determine whether or not a capability page for the web site/web page exists (checked at block 260). If it does not, then a new capability page entry is created for site/page (block 270). A pointer is created/updated in another capability page for the same provider hosting the newly browsed site/page (block 280). In so doing, all of the capability pages for a particular provider are linked together, making updating and querying more efficient.

If there is no capability page whatsoever for the provider, then a new capability page is created (block 255). If a capability page entry for a site/page or provider is created, the content delivery phase can begin (block 257). Whenever a user visits a new web site (block 230), this querying and creating, if needed, of capability pages, is repeated. The content delivery phase is described in greater detail below the respect to FIG. 4. Essentially, by comparing capability pages and the baseline profile against a set of rules, more relevant content is presented automatically to the user.

FIG. 3 illustrates one embodiment of a capability page for a participating provider in intelligent content delivery.

A capability page 300 is created on a user's machine by the participating content provider. Once created, the provider is able to send content to the user on the basis of their capabilities and information offering. Where a provider has more than one web site or maintains portions (pages) of content on one site that they wish to differentiate or that is distinctly different from the information offering in other portions of the site, a new capability page entry can be created. Rather, than updating and querying multiple capability pages for the same provider, each provider's capability page can have a pointer to its next capability page, so that a single virtual record of capability page entries is maintained.

Each participating provider is assigned, by a common algorithm, a unique identifier, which is the same as the capability page identifier, allowing support for multiple capability pages for the same provider. Each capability page consists of three sections-Hardware Capabilities, Interest Capabilities, and Miscellaneous Capabilities. Each capability page also has a "Next Page" pointer field having either a null value, indicating no further capability pages for the provider or a derived identifier to the next capability page. This derived identifier is based on the unique capability page identifier.

The Hardware Capabilities section of capability page 300 includes information regarding what specifications the provider supports such as the Connection Speed of the network connection, the Graphics Card Support, and the CPU type. A content provider can use this information to increase or decrease the performance of content. For example, the content can be scaled depending upon the capability of the user's computer. The Interest Capabilities section specifies the subject matter(s) of the site, such as sports, educational, etc., and the capability page 300 allocates space for three such Interest Capabilities. The Miscellaneous Capabilities section is undefined, but may include, in one embodiment, the rating of the site as it relates to objectionable content, such as whether the site contains strong language, nudity, violence, or sex.

Figure 4:
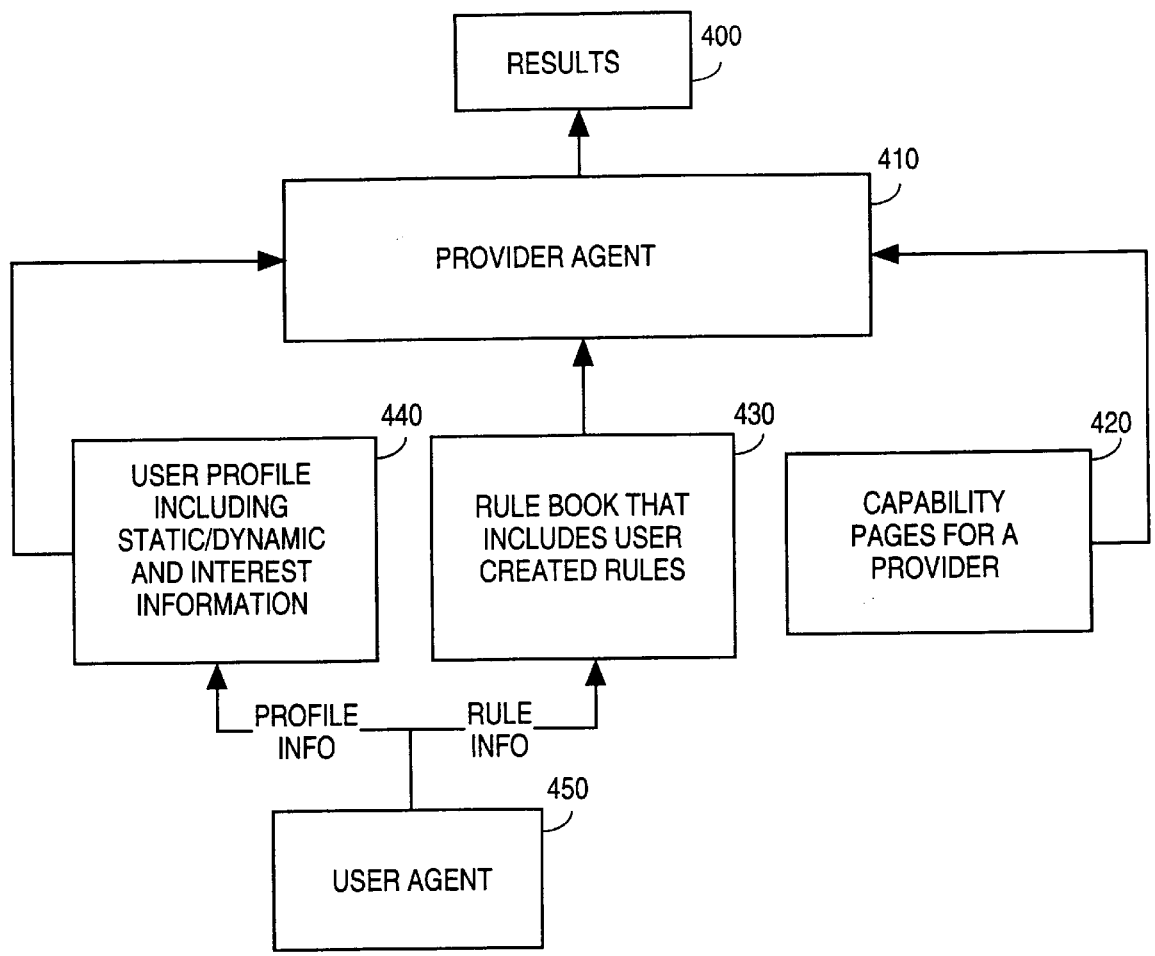
FIG. 4 illustrates agent interaction in intelligent content delivery.

FIG. 4 illustrates one embodiment of agent interaction in intelligent content delivery.

To facilitate intelligent content delivery, mechanisms known as agents are utilized. One such mechanism is a user agent 450 which provides information for a baseline profile 440 and rule information for the rule book 430, including rules created by the user. Another mechanism defined in one embodiment of the invention is a provider agent 410 which performs handshaking between the user machine and the provider. Only one provider agent is used per provider regardless of the number of capability pages that may be created for the provider, since these follow the same specification. In one embodiment of the invention, the lack of both capability page and provider agent will be detected by the provider when a particular user visits the provider's site for the very first time. In this embodiment, not only is a capability page created in the setup phase, but the provider agent 410 is also downloaded from the provider and installed (such as with a plug-in) automatically on the user machine. Once downloaded, one task of the provider agent is to monitor and update, if necessary, the capability pages 420 for that provider. The provider agent 410 and capability page 420 have a version number associated with them which is compared against the current version numbers stored on the provider's site.

Once the capability page 420 and provider agent 410 have been downloaded for the provider, the provider agent 410 and user agent 450 interact to generate results 400 specifying what content the provider needs to deliver. This interaction or handshaking primarily involves extracting certain rules from the rule book 430 and comparing them with both the capability page 420 and user profile 440 to create results 400. Results 400 are sent back to the provider in, for instance, the form of an XML (Extensible Markup Language) document which the provider uses to generate content. The provider will have a mechanism local to its site that extracts only that content which is set forth in the generated results.

To minimize the extra lag time inherent in such operations as downloading/installing of provider agent and capability page and of generation of results values, default content that is normally available to any user can first be automatically presented to the user, as would be the ordinary web site not participating in intelligent content delivery. Further, the provider agent can be run in the background and even display the results-based content on a separate window, called a preferred content window so as not to interfere with the ordinary web browsing operation. Furthermore, the results of 400 do not need to be updated (and may be re-used upon a re-visit to the web site) for a given provider unless either the user profile or the capability changes in certain key sections such as the interest section.

Figure 5:
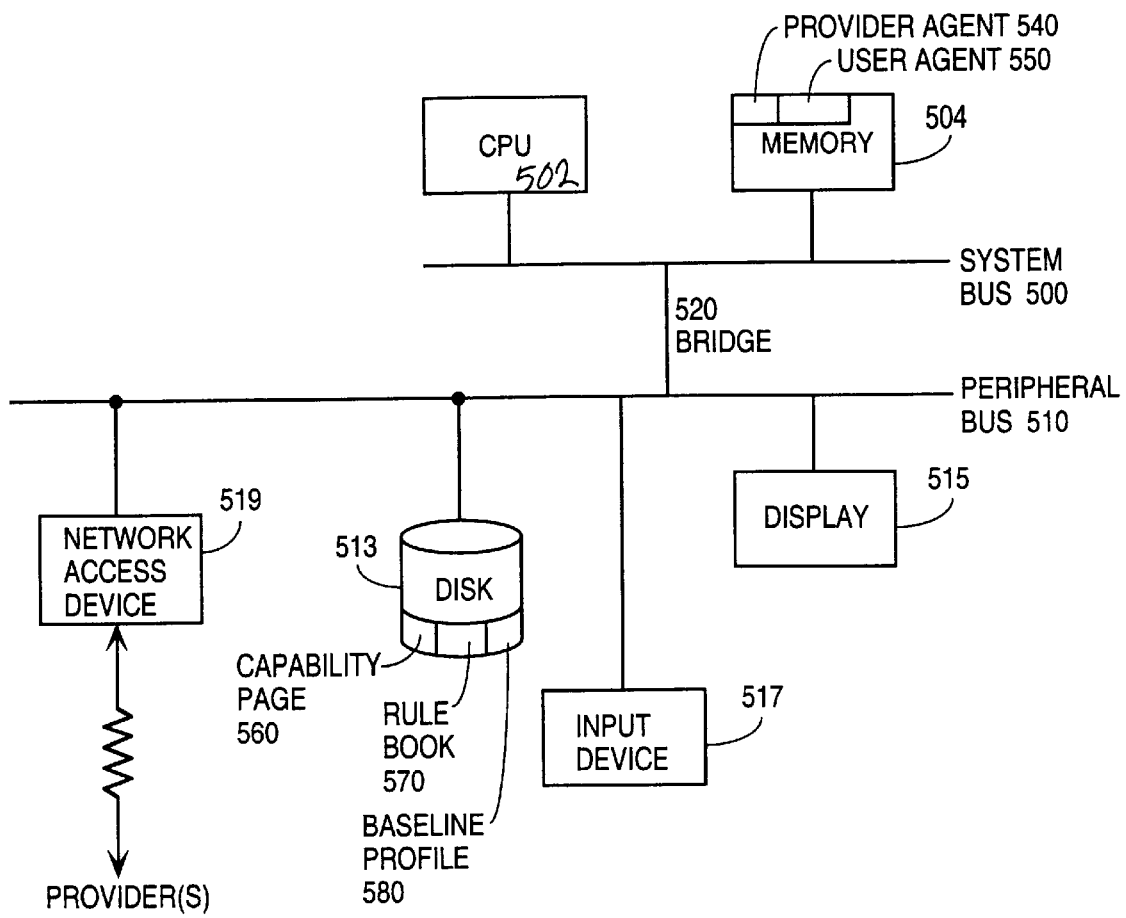
FIG. 5 is a system diagram of an information device embodying an intelligent content delivery system.

FIG. 5 illustrates one embodiment of an information device embodying an intelligent content delivery system.

The exemplary information device of FIG. 5 may be any general or special purpose information device such as a personal computer system. One configuration for such a device includes a bridge 520 that interconnects a peripheral bus 510 with a system bus 500. The system bus 500 connects on its lines a CPU (Central Processing Unit) 502 capable of processing instructions such as those specifying the comparing of data and the performing of arithmetic and logic functions and a memory 504 capable of storing data and loading instructions which are then executed by CPU 502. In accordance with an embodiment of the invention, a provider agent 540 and user agent 550 may be loaded into memory 504, behaving as described above.

The peripheral bus 510, such as a PCI (Peripheral Component Interconnect) bus, is capable of hosting a number of peripheral devices such as a network access device 519, disk 513, display 515 (usually interface through a display adapter, not shown) and an input device 517. Disk 513 may store capability pages 560, rule book 570, and a baseline profile 580. Network access device 519 may be used to connect to the Internet and download content from providers each of whom have capability pages 560 and a provider agent 540 that updates and maintains the capability pages 560. The user agent 550 handles the maintenance and update of baseline profile 580.

When a user begins browsing on the Internet for the first time, user agent 550 creates baseline profile 580, storing the contents on disk 513. The user agent 550 is loaded into memory 504 by CPU 502 which then instructs the user agent to create baseline profile 580. Once complete, the information in baseline profile 580 is categorized by user agent 550 into static, dynamic, and user-specific profiling information. A user may enter into user-specific profiling information via input device 517, with the input procedure transacted by user agent 550. User agent 550 also creates and updates rule pages in rulebook 570.

After the baseline profile and rule book are created, each provider content site (such as a web site) browsed by the user will trigger one of three actions:

1. The provider will check via network access device 519 for the existence of a provider agent 540 and capability page 560, and if not found, the provider will send a provider agent, which is loaded into memory 504, and a capability page, which is stored on disk 513.
2. If the provider agent exists, its version number is checked, and if out-of-date, a new provider agent will be downloaded to the user machine via network access device 519 to replace the out-of-date provider agent 540. Likewise, the version number of the capability page is also checked and the capability page is replaced is with a new page if needed.
3. If a capability page exists for the provider but not for the site (in the case of a provider hosting multiple sites), a capability page entry is created and a pointer to that new entry is created in the last capability page entry for the provider.

Using the rule book, the capability page 560 and the baseline profile 580 is compared by the provider agent 540 creating results data. The provider queries the provider agent 540 and delivers content via the network access device 519 in accordance with those results. The content can then be browsed by the user using input device 517 and output on display 515.

In the foregoing specification, the invention has been described with reference to specific exemplary embodiments thereof. It will however be evident that various modifications and changes may be made thereto without departing from the broader spirit and scope of the invention as set forth in the appended claims. The specification and drawings are accordingly to be regarded as illustrative rather than restrictive.

What is claimed is:

1. A computer implemented method, comprising:

collecting relevant data from a user, from the user's computer, and from a provider;

generating results information from the relevant data, said results information specifying which content from a provider is relevant to a user; and downloading content from said provider in accordance with said results information.

2. A method according to claim 1 wherein said generating comprises:

setting up a user machine, said user machine utilized by said user to browse a site maintained by said provider, for intelligent content delivery from said provider; and comparing a plurality of profiles related to said user, said user machine and said provider, said comparison indicating what content of said provider matches the interests and capabilities of said user.

3. A method according to claim 2 wherein said setting up includes:

creating a baseline user profile for the user on said user machine; and categorizing said baseline user profile into static, dynamic, and user-specific profiling information.

4. A method according to claim 3 wherein setting up includes:

if a capability page does not exist for said provider, creating a capability page for said provider; and if a capability page does exist for said provider, checking whether a capability page entry exists for the site maintained by said provider if said provider maintains more than one site.

5. A method according to claim 3 wherein:

if a capability page entry does not exist for the site maintained by said provider if said provider maintains more than one site, then creating a new capability page entry for said site; and updating a pointer in an existing capability page for said provider to point to said newly created entry.

6. A method according to claim 2 wherein setting up includes:

creating a rule book specifying a manner in which to perform said comparison; and providing rule pages for said rule book.

7. A method according to claim 6 wherein said comparing includes comparing said baseline user profile with a capability page for said provider in accordance with said rule book.

8. A method according to claim 4 wherein said capability page is updated by said provider as needed.

9. A method according to claim 3 wherein said baseline profile is updated as needed, and said static profiling information is updated less often than said dynamic profiling information.

10. An article of manufacture comprising a computer readable medium having instructions stored thereon which when executed causes:

collecting relevant data from a user, from the user's computer, and from a provider;

generating results information from the relevant data, said results information specifying which content from a provider is relevant to a user; and downloading content from said provider in accordance with said results information.

11. A system comprising:

a bus;

a processor coupled to the bus;

a memory coupled to said processor, said memory adapted to load a user agent; and a disk coupled to said bus adapted to store a baseline user profile and a rule book.

12. A system according to claim 11 comprising:

a network access device coupled to said bus, said network access device adapted to transact data with a content provider, said content provider adapted to send a provider agent via said network access device, said provider agent loadable in said memory.

13. A system according to claim 12 wherein said user agent is adapted to maintain and update said baseline user profile and to provide rules pages for said rule book.

14. A system according to claim 12 wherein said content provider is adapted to send a capability page storable on said disk, said capability page maintained and updated by said provider agent.

15. A system according to claim 14 wherein said data transacted includes content from said provider, said content in accordance with applying said rule book to said capability page and said baseline user profile.

* * * * *